United States Patent
Alberth, Jr. et al.

(10) Patent No.: US 8,340,215 B2
(45) Date of Patent: Dec. 25, 2012

(54) RADIO TRANSCEIVER ARCHITECTURES AND METHODS

(75) Inventors: William Alberth, Jr., Crystal Lake, IL (US); Armin Klomsdorf, Libertyville, IL (US); Robert Stengel, Pompano Beach, FL (US)

(73) Assignee: Motorola Mobility LLC, Libertyville, IL (US)

( * ) Notice: Subject to any disclaimer, the term of this patent is extended or adjusted under 35 U.S.C. 154(b) by 2545 days.

(21) Appl. No.: 10/206,706

(22) Filed: Jul. 26, 2002

(65) Prior Publication Data

US 2004/0017847 A1 Jan. 29, 2004

(51) Int. Cl.
- *H04L 27/18* (2006.01)
- *H04L 1/02* (2006.01)
- *H04B 7/08* (2006.01)

(52) U.S. Cl. .................... 375/316; 375/347; 455/132

(58) Field of Classification Search .......... 329/316, 329/348, 304; 375/335, 219–223, 302, 316, 375/322, 329, 324, 344, 346, 347, 267; 455/130–355, 73
See application file for complete search history.

(56) References Cited

U.S. PATENT DOCUMENTS

| | | | | | |
|---|---|---|---|---|---|
| 4,742,563 | A | * | 5/1988 | Fukumura | 455/132 |
| 5,068,628 | A | * | 11/1991 | Ghoshal | 331/1 A |
| 5,239,274 | A | * | 8/1993 | Chi | 331/57 |
| 5,247,469 | A | * | 9/1993 | McCune, Jr. | 708/276 |
| 5,260,608 | A | * | 11/1993 | Marbot | 327/261 |
| 5,303,400 | A | * | 4/1994 | Mogi | 455/186.1 |
| 5,428,318 | A | * | 6/1995 | Razavi | 331/57 |
| 5,451,894 | A | * | 9/1995 | Guo | 327/241 |
| 5,471,659 | A | * | 11/1995 | Wong | 455/132 |
| 5,535,247 | A | * | 7/1996 | Gailus et al. | 375/297 |
| 5,561,692 | A | * | 10/1996 | Maitland et al. | 375/371 |
| 5,668,504 | A | * | 9/1997 | Rodriques Ramalho | 331/1 A |
| 5,748,683 | A | * | 5/1998 | Smith et al. | 375/347 |
| 5,764,111 | A | * | 6/1998 | Bushman | 331/57 |
| 5,805,003 | A | * | 9/1998 | Hsu | 327/270 |
| 5,913,155 | A | * | 6/1999 | Tomiyama | 455/142 |
| 5,955,902 | A | * | 9/1999 | Takada et al. | 327/116 |
| 6,009,134 | A | * | 12/1999 | Yoon | 375/376 |
| 6,044,120 | A | * | 3/2000 | Bar-David et al. | 375/347 |
| 6,100,735 | A | * | 8/2000 | Lu | 327/158 |
| 6,148,186 | A | * | 11/2000 | Fujita | 455/137 |
| 6,205,193 | B1 | * | 3/2001 | Solve et al. | 375/354 |
| 6,226,505 | B1 | * | 5/2001 | Uda | 455/255 |

(Continued)

FOREIGN PATENT DOCUMENTS

JP    1995264023 A1    10/1995

OTHER PUBLICATIONS

Jerry D. Gibson, "The Communications Handbook", 1997, CRC Press, p. 11.*

(Continued)

*Primary Examiner* — Tesfaldet Bocure

(57) ABSTRACT

A radio communications device 100 including a processor 120 having a digital signal processor (DSP) coupled to a transceiver 110. The transceiver includes a digital-to-phase synthesizer having one or more independently variable frequency or phase signal outputs coupled to a transmitter and/or to a receiver. The variable frequency and phase outputs of the digital-to phase synthesizer are mixed with corresponding received signals and are capable of frequency or phase modulating information signals for transmission. Amplitude modulated signals may be provided through polar modulation by combining synthesizer outputs at a summer.

22 Claims, 5 Drawing Sheets

U.S. PATENT DOCUMENTS

| | | | |
|---|---|---|---|
| 6,236,690 B1 * | 5/2001 | Mimura et al. | 375/334 |
| 6,353,649 B1 | 3/2002 | Bockleman et al. | |
| 6,380,786 B1 * | 4/2002 | Schenck et al. | 327/276 |
| 6,385,442 B1 * | 5/2002 | Vu et al. | 455/318 |
| 6,445,252 B1 * | 9/2002 | Eilken et al. | 331/34 |
| 6,463,266 B1 * | 10/2002 | Shohara | 455/196.1 |
| 6,515,633 B2 * | 2/2003 | Ippolito | 343/797 |
| 6,556,630 B1 * | 4/2003 | Brinsfield et al. | 375/335 |
| 6,791,379 B1 * | 9/2004 | Wakayama et al. | 327/156 |
| 6,906,570 B2 * | 6/2005 | Kim | 327/292 |
| 6,954,097 B2 * | 10/2005 | Harrison | 327/237 |
| 6,995,621 B1 * | 2/2006 | Culler | 331/57 |
| 7,098,710 B1 * | 8/2006 | New et al. | 327/158 |
| 7,148,758 B1 * | 12/2006 | Ross et al. | 331/17 |
| 7,157,951 B1 * | 1/2007 | Morrison et al. | 327/263 |
| 7,323,917 B2 * | 1/2008 | Cho et al. | 327/158 |
| 2002/0032042 A1 * | 3/2002 | Poplawsky et al. | |
| 2002/0089381 A1 * | 7/2002 | Mullgrav et al. | 331/17 |
| 2003/0099321 A1 * | 5/2003 | Juan et al. | 375/376 |
| 2003/0119465 A1 * | 6/2003 | Martin et al. | 455/260 |

OTHER PUBLICATIONS

U.S. Appl. No. 10/036,558, filed Dec. 21, 2001, Martin.
U.S. Appl. No. 10/000,914, filed Nov. 2, 2001, Juan.
U.S. Appl. No. 09/633,705, filed Aug. 7, 2000, Martin.
U.S. Appl. No. 09/780,077, filed Feb. 9, 2001, Bockelman.
U.S. Appl. No. 10/050,233, filed Jan. 16, 2002, Stengel.

* cited by examiner

RADIO TRANSCEIVER ARCHITECTURES AND METHODS

CROSS REFERENCE TO RELATED APPLICATIONS

The present application is related to commonly assigned and co-pending U.S. application Ser. No. 09/633,705 filed on 7 Aug. 2000 entitled "Digital-To-Phase Converter", U.S. application Ser. No. 09/780,077 filed on 9 Feb. 2001 entitled "Direct Digital Synthesizer Based On Delay Line With Sorted Taps", U.S. application Ser. No. 10/000,914 filed on 2 Nov. 2001 entitled "Cascaded Delay Locked Loop Circuit, U.S. application Ser. No. 10/365,558 filed on 21 Dec. 2001 entitled Digital-To-Phase Converter With Extended Frequency Range", U.S. application Ser. No. 10/050,233 filed on 16 Jan. 2002 entitled "Delayed Locked Loop Synthesizer With Multiple Outputs And Digital Modulation", all of which are assigned commonly and co-pending with the present application.

FIELD OF THE INVENTIONS

The present inventions relate generally to radio communications, and more particularly to adaptive and multi-mode radio transceiver architectures, for example in wireless communications devices, and methods therefor.

BACKGROUND OF THE INVENTIONS

The various aspects, features and advantages of the present invention will become more fully apparent to those having ordinary skill in the art upon careful consideration of the following Detailed Description of the Invention with the accompanying drawings described below.

DETAILED DESCRIPTION OF THE INVENTIONS

Figure 1:
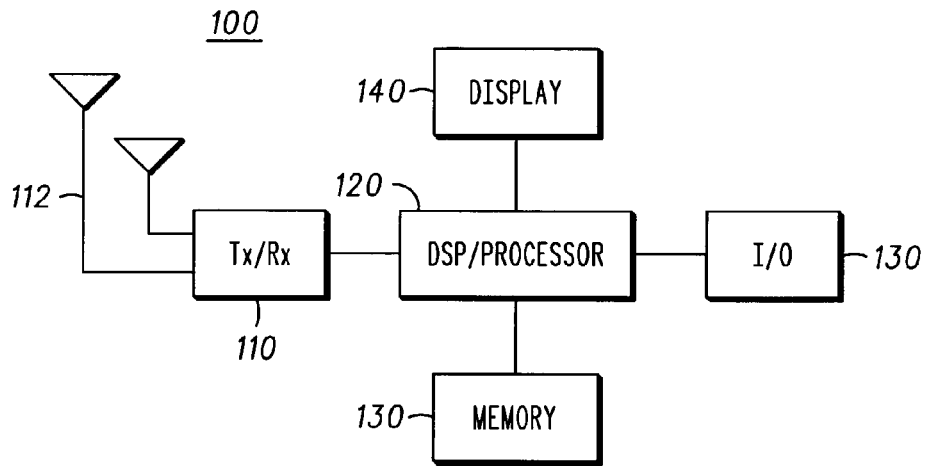
FIG. 1 is 1 is an exemplary communications device electrical schematic block diagram.

FIG. 1 is an exemplary communications device 100 comprising a transceiver 110, for example a mobile wireless cellular communications transceiver or a base station transceiver. In other embodiments, the communications device is a receiver only or a transmitter only, examples of which are discussed below.

The exemplary communications device 100 also comprises generally a processor 120 having a digital signal processor (DSP) coupled to the transceiver 110. The exemplary DSP is integrated with the processor, although in other embodiments the DSP is a discrete component, and in some embodiments the DSP may not be required.

The processor 120 is coupled to memory 130, including for example RAM and ROM and in some embodiments some type of flash memory. The exemplary device includes a display 140, for example a low power LCD display device. The exemplary communications device also includes generally input and output devices 130, for example, an alphanumeric keypad, scrolling and/or pointing devices, a microphone, an audio output, input and output signal ports, etc., depending on the nature of the device.

The communications devices of the present invention include preferably a digital-to-phase synthesizer having one or more fixed or variable frequency and phase outputs coupled to a transmitter and/or to a receiver, or to a transceiver of the type illustrated schematically in FIG. 1.

Figure 2:
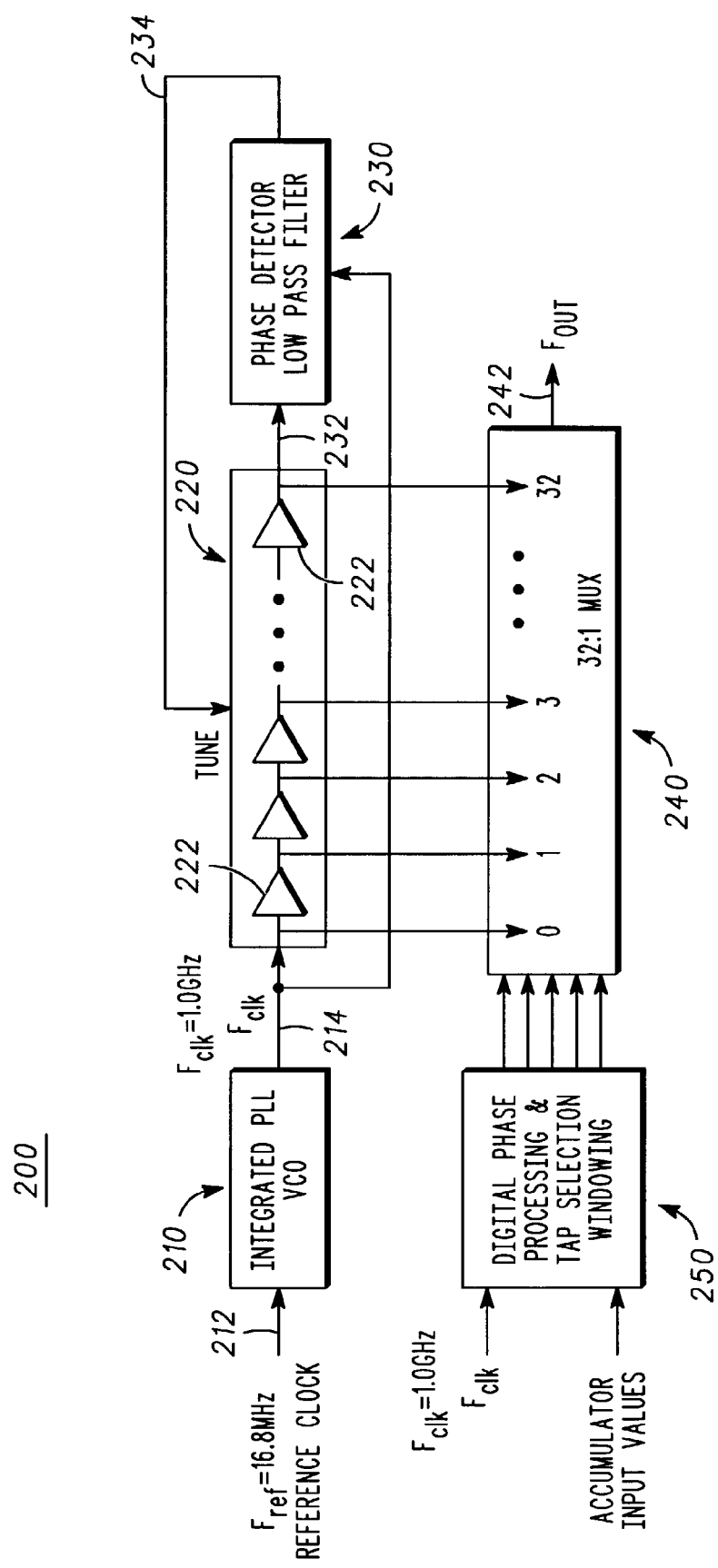
FIG. 2 is an electrical schematic block diagram of an exemplary digital-to-phase synthesizer.

FIG. 2 illustrates a digital-to-phase synthesizer 200 comprising generally an integrated phase-locked loop (PLL) voltage controlled oscillator (VCO) 210 having a reference frequency input $F_{REF}$ 212 and an integrated PLL VCO signal output $F_{CLK}$ 214, which is coupled to an input of a delay line 220 that generates controlled delayed versions of the reference frequency signal input, which is the PLL VCO signal output $F_{CLK}$ 214 in FIG. 2.

In the exemplary embodiment of FIG. 2, the delay line 220 comprises a plurality of inverter buffers 222 connected in series, only some of which are identified by reference numerals. The input and output of the delay line 220 is locked to a desired delay time with a phase detector and low pass filter 230 having an input 232 coupled to an output of the delay line. The phase detector and low pass filter 230 also includes an output 234 coupled to an input of the delay line.

In one embodiment, the delay line is tuned to a single wavelength of the VCO signal output, $F_{CLK}$ 214, input to the delay line 220. In the exemplary embodiment, a serial arrangement of 32 buffers, each having a 31.25 p-second delay, is driven with a 1.0 GHz input clock, $F_{CLK}$ 214, and locked to a total delay of 1000.0 p-seconds.

Digital-to-phase synthesizers and the delay locked loop circuits are disclosed more fully in co-pending U.S. application Ser. No. 09/633,705 filed on 7 Aug. 2000 entitled "Digital-To-Phase Converter", in co-pending U.S. application Ser. No. 09/780,077 filed on 9 Feb. 2001 entitled "Direct Digital Synthesizer Based On Delay Line With Sorted Taps", in co-pending U.S. application Ser. No. 10/000,914 filed on 2 Nov. 2001 entitled "Cascaded Delay Locked Loop Circuit", and in co-pending U.S. application Ser. No. 10/365,558 filed on 21 Dec. 2001 entitled Digital-To-Phase Converter With Extended Frequency Range", the subject matter of which is incorporated herein by reference.

In the exemplary embodiment of FIG. 2, the delay line 220 includes a plurality of output taps between each of the 32 buffers. Each output tap provides a 1.0 GHz output signal having a 360/32=11.25 degree offset relative to the preceding output tap. In FIG. 2, a multiplexor 240 comprises a plurality of inputs coupled to the output signal taps along the delay line 220. A digital phase processor 250 comprises outputs that control the multiplexor 240 in a manner that selects combinations of phase shifted signals along output taps of the delay line to produce a new output signal $F_{OUT}$ 242 having phase and frequency parameters independent of the original input clock signal $F_{CLK}$ 214. The output signal of the digital-to-phase synthesizer may be frequency or phase modulated, which having utility in transmitter applications discussed further below.

Digital-to-phase synthesizers are disclosed more fully in co-pending U.S. application Ser. No. 09/633,705 filed on 7 Aug. 2000 entitled "Digital-To-Phase Converter", in co-pending U.S. application Ser. No. 09/780,077 filed on 9

Feb. 2001 entitled "Direct Digital Synthesizer Based On Delay Line With Sorted Taps", and in co-pending U.S. application Ser. No. 10/365,558 filed on 21 Dec. 2001 entitled Digital-To-Phase Converter With Extended Frequency Range", the subject matter of which is incorporated herein by reference.

Digital processing and tap selection windowing of digital-to phase synthesizers of the type utilized in the present invention comprises generally determining when to select a tap or taps and which ones to select. More particularly, the input clock cycle during which to process a tap signal output is determined by a frequency accumulator, and a phase accumulator determines which tap to route to the output path. Routing of selected delayed reference clock signal pulses to a subsequent delay line or output port is controlled by a window trigger signal.

The digital processing and tap selection windowing of digital-to-phase synthesizers is disclosed more fully in co-pending U.S. application Ser. No. 10/050,233 filed on 16 Jan. 2002 entitled "Delayed Locked Loop Synthesizer With Multiple Outputs And Digital Modulation" and in co-pending U.S. application Ser. No. 10/365,558 filed on 21 Dec. 2001 entitled "Digital-To-Phase Converter With Extended Frequency Range", among the other applications referenced herein, the subject matter of which is incorporated herein by reference.

Phase, amplitude or frequency modulation or a combination thereof can be applied to a digital to phase synthesizer by way of a number of methods, including modulation of the reference input, summing an offset signal with the delay line tuning signal, modulating control words, and modifying a tap selection word. The most direct method of applying phase modulation to the output signal is to sum a digital word with a Cj value. The modulated value would be a digital word representing the normalized phase offset modulation or the desired phase shift in radians divided by 2 p. This can be a positive or negative offset by as much as 2 p. In general, this can be achieved in a delay locked loop having delay line with a plurality of tap outputs using a tap selection processor that selects a sequence of time varying tap addresses C(t) that vary in accordance with a time varying modulating signal A(t), where:

A(t)=normalized phase modulating signal
A(t)=phase modulating signal×K.C/(2 p).
$C_{ja}=C_{(j-1)a}+C$
$C_{jb}=C_{ja}+A(t)$ If the harmonic content of the resulting output signal is ignored (or removed, e.g., by filtering), the output signal at output $F_{outb}$ is given by:

$$F_{outb}(t)=x\,e^{-j[i\,t+2pA(t)]}$$

Where x is an amplitude constant. A tap selection processor selects a sequence of time varying tap addresses $C_j(t)$ that vary in time in accordance with a modulating signal m(t). The time varying tap addresses $C_j(t)$ are applied to a multiplexer circuit to select a time varying sequence of tap outputs as a phase modulated output signal $F_{out}(t)$. In one embodiment, the tap selection processor uses an adder that adds the modulating signal m(t) to a selected sequence of tap addresses $C_j$ to produce $C_j(t)$. By applying a time varying signal A(t) as an input to the summer 312, the values of the $C_{jb}(t)$ coefficients are time varying and modulated according to the time varying nature of A(t). These time varying coefficients $C_{jb}(t)$ are then used to select taps using a multiplexer as previously described. This produces a time varying phase shift of the output signal $F_{outb}(t)$ with the phase of $F_{outb}(t)$ varying in accordance with A(t) to produce digital phase modulation.

These and other aspects of modulation are discussed more fully in co-pending U.S. application Ser. No. 10/050,233 filed on 16 Jan. 2002 entitled "Delayed Locked Loop Synthesizer With Multiple Outputs And Digital Modulation".

Figure 3:
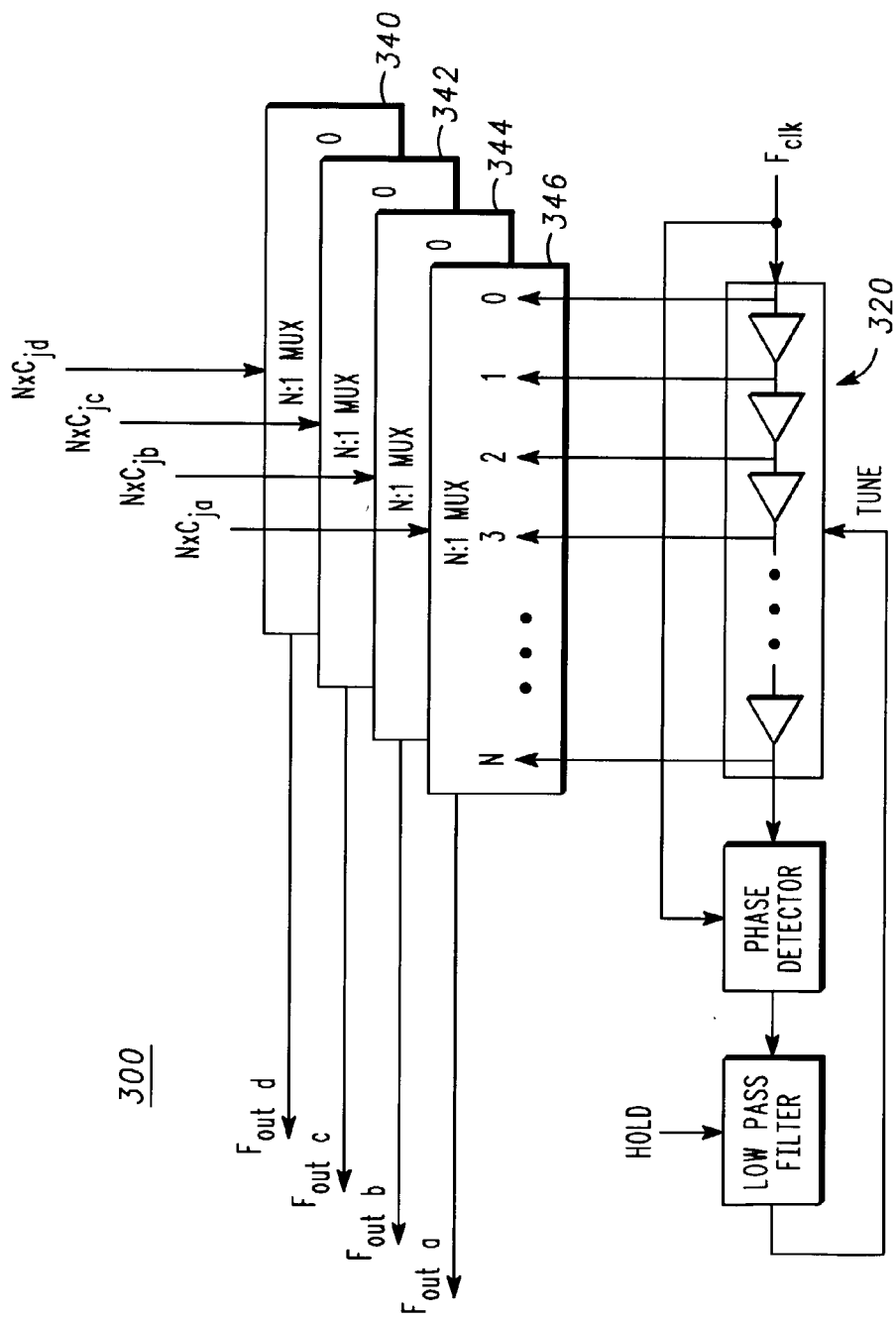
FIG. 3 is an electrical schematic block diagram of an exemplary digital-to-phase synthesizer with multiple outputs.

FIG. 3 illustrates a digital-to-phase synthesizer architecture 300 comprising a single delay line 320, the output taps of which are independently selectable by a plurality of parallel multiplexors 346, 344, 342 and 340 having corresponding independent output signals $F_{OUTD}$, $F_{OUTC}$, $F_{OUTB}$ and $F_{OUTA}$, all of which have independently controllable frequencies and/or phases.

Figure 4:
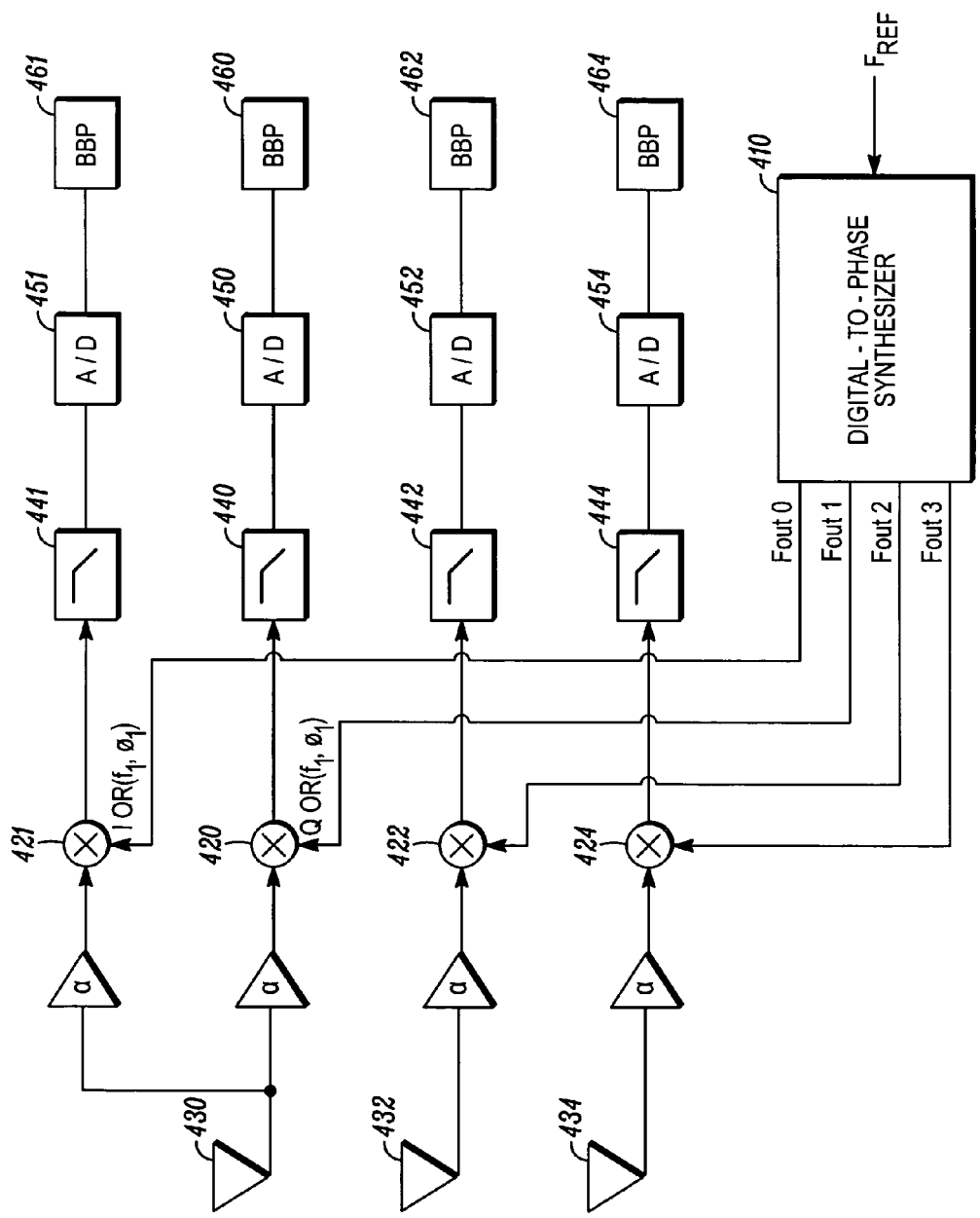
FIG. 4 is an electrical schematic illustration of an exemplary radio receiver.

FIG. 4 is an exemplary radio receiver 400 comprising a digital-to-phase synthesizer 410 having a reference frequency input $F_{REF}$ and one or more outputs having independently controlled frequencies and/or phases, as discussed generally above. The exemplary digital-to-phase synthesizer includes multiple signal outputs $F_{OUT1}$, $F_{OUT2}$ and $F_{OUT3}$. The receiver 400 may be a stand-alone receiver or part of a transceiver.

In one embodiment, digital-to-phase synthesizer outputs are coupled to corresponding mixers having corresponding inputs coupled to one or more receiver antennas. In FIG. 4, the digital-to-phase synthesizer outputs $F_{OUT0}$, $F_{OUT1}$, $F_{OUT2}$ and $F_{OUT3}$ are coupled to corresponding mixers 420, 421, 422 and 424, respectively. The mixers 420, 422 and 424 are coupled to corresponding antennas 430, 432 and 434 but in other embodiments two or more of the mixers may be coupled to the same antenna. For example, mixer 421 is coupled to the same antenna, antenna 430, as mixer 420.

In some embodiments, there may be included amplification and frequency selection of the received signal prior to mixing. Also, the one or more received signals may be mixed with quadrature components of the digital-to-phase synthesizer output signals. In FIG. 4, for example, digital-to-phase synthesizer 410 outputs $F_{OUT0}$, $F_{OUT1}$ may in some embodiments or applications be quadrature components (I, O) mixed with the signal received at antenna 430. In other embodiments, quadrature component outputs of the digital-to-phase synthesizer may be mixed with signals received at different antennas. In an alternative embodiment, the digital-to-phase synthesizer 410 outputs $F_{OUT0}$, $F_{OUT1}$, having the same phase and frequency ($f_1$, $\phi_1$), are mixed with the signal received at antenna 430.

The output of the one or more mixers is coupled generally to a demodulator. In FIG. 4, the output of the mixers is filtered by filters 440, 441, 442 and 444 and digitized at A/D converters 450, 451, 452 and 454 before processing by baseband processors 460, 461, 462 and 464. In the exemplary digital receiver architecture of FIG. 4, the baseband processing is performed by a digital signal processor (DSP), as illustrated generally in FIG. 1. In embodiments with multiple mixers, the baseband processing may be performed by one or more processors, which may be integrated or discrete components.

Figure 5:
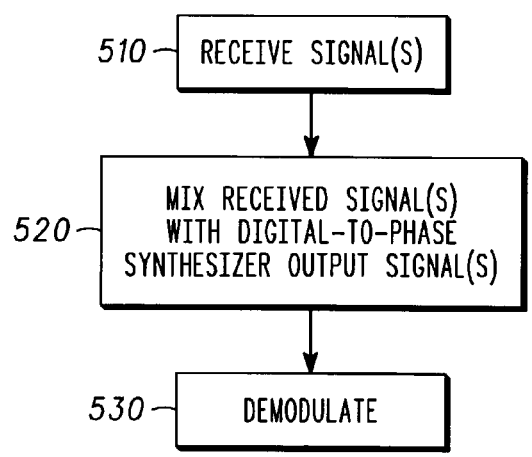
FIG. 5 is an exemplary receiver process flow diagram.

In some embodiments, illustrated in the receiver process flow chart of FIG. 5, one or more signals are received at block 510. The received signal is down-converted by mixing 520 with a first digital-to-phase synthesizer output signal, and the down-converted signal is demodulated at block 530. As noted, the received signal or signals may be amplified and subject to frequency selection before mixing. In some embodiments where multiple signals are received, the second signal is down-converted by mixing with a second digital-to-phase synthesizer output signal while down-converting the first received signal.

In diversity receiver applications, the received signal is down-converted by mixing it with first and second digital-to-phase synthesizer output signals having the same frequency and the same phase. In one embodiment, the signal is received at first and second antennas having a diversity relationship, for example spacial diversity. Other diversity receiver embodiments are characterized by polarizing diversity, or some form of propagation mode diversity, or time diversity, et cetera as known generally by those having ordinary skill in the art.

In multiple input multiple output (MIMO) receiver applications, a signal received at different antennas of the receiver is mixed with at least two digital-to-phase synthesizer output signals having the same frequency.

In adaptive array receiver applications, a signal received by multiple antennas is mixed with a corresponding multiple of digital-to-phase synthesizer output signals having the same frequency. An adaptive array is realized by changing the phases of at least one of the multiple digital-to-phase synthesizer output signals mixed with the received signal.

In multi-mode receiver applications, the receiver receives multiple signals having different frequencies, for example Global Positioning System (GPS) enabled wireless communications devices, and multi-system cellular devices, combination wide area network (WAN) and cellular communications devices, etc. Multi-mode receivers thus generally include one or more baseband processors capable of processing the variety of signals received. In some applications, the receiver includes different antennas for receiving the various signals, for example a GPS antenna and a multi-band cellular antenna. The received signals are mixed with corresponding digital-to-phase synthesizer output signals having different frequencies and/or phases prior to baseband processing, or demodulation.

In cellular network neighbor list scanning applications, at least two signals having different frequencies are received and mixed with corresponding digital-to-phase synthesizer output signals having different frequencies. Neighbor lists may thus be scanned while receiving another signal on a broadcast or a dedicated channel.

Figure 6:
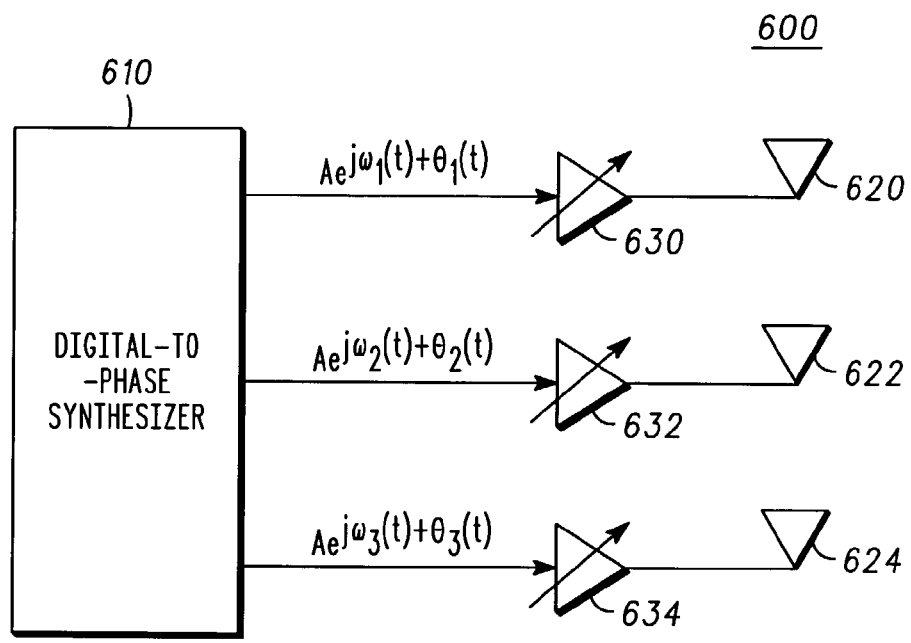
FIG. 6 is an exemplary frequency/phase modulation transmitter.

FIG. 6 is an exemplary radio transmitter 600 comprising a digital-to-phase synthesizer 610 having one or more frequency or phase modulated signal outputs coupled to corresponding antennas 620, 622 and 624 for transmission. The transmitter may be a stand-alone device or part of a transceiver. The modulated signal outputs of the digital-to-phase synthesizer are typically amplified before transmission, for example by amplifiers 630, 632 and 634 in FIG. 6. In some embodiments having more than one modulated output signal from the digital-to-phase synthesizer, the modulated outputs are transmitted from a common antenna, depending upon the requirements of the particular application.

Figure 7:
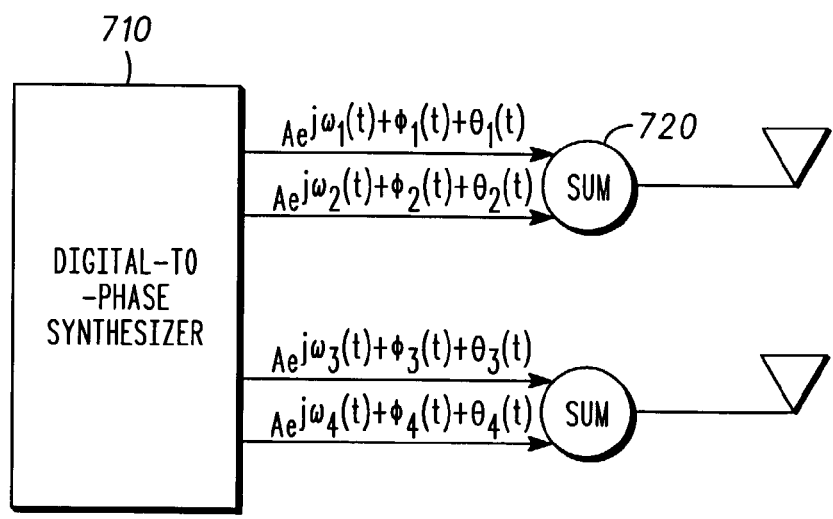
FIG. 7 is an exemplary amplitude modulation transmitter.

In FIG. 6, the digital-to-phase synthesizer 610 frequency or phase modulates one or more information signals for transmission by selectively tapping the phase shifted outputs signals along the delay line of the digital-to-phase synthesizer, as discussed above and disclosed more fully in one or more of the co-pending patent applications referenced hereinabove. In FIG. 6, an adaptive array transmitter may be realized by changing the phase of at least one of multiple frequency modulated signals transmitted by the transmitter. FIG. 7 is another exemplary radio transmitter 700 comprising a digital-to-phase synthesizer 710 having two frequency modulated outputs that are added at a summer 720, the output of which may be amplified before transmission.

While the present inventions and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A method in a radio transceiver, comprising:
receiving a first signal;
down-converting the first signal received by mixing it with a first digital-to-phase synthesizer output signal produced from a first plurality of signals tapped along a delay line;
receiving a second signal while receiving the first signal;
down-converting the second signal received by mixing it with a second digital-to-phase synthesizer output signal produced from a second plurality of signals tapped along a delay line while down-converting the first signal received.

2. The method of claim 1,
generating the first digital-to-phase synthesizer output signal by multiplexing the first plurality of signals tapped along the delay line,
generating the second digital-to-phase synthesizer output signal by multiplexing the second plurality of signals tapped along the delay line.

3. The method of claim 1,
receiving the first signal at a first antenna, receiving the second signal at a second antenna,
the first and second digital-to-phase synthesizer output signals having the same frequency and the same phase.

4. The method of claim 1,
receiving the first signal at a first antenna, receiving the second signal at a second antenna;
the first and second digital-to-phase synthesizer output signals having the same frequency,
realizing an adaptive array by changing the phases of at least one of the first and second digital-to-phase synthesizer output signals.

5. The method of claim 1,
the first and second signals having different frequencies,
the first and second digital-to-phase synthesizer output signals having different frequencies.

6. The method of claim 1,
the first signal is the same as the second signal;
receiving the first signal at a first antenna, receiving the second signal at a second antenna,
the first and second digital-to-phase synthesizer output signals having the same frequency.

7. The method of claim 1,
the first signal has a different frequency than the second signal,
scanning a neighbor list by receiving the second signal while receiving the first signal,
the first and second digital-to-phase synthesizer output signals having different frequencies.

8. The method claim 1, mixing the first signal with the first digital-to-phase synthesizer output signal, mixing the second signal with the second digital-to-phase synthesizer output signal, the first and second digital-to-phase synthesizer output signals are in quadrature.

9. The method of claim 1, down-converting the first and second signals received by mixing the first and second signals with corresponding first and second fixed frequency digital-to-phase synthesizer output signals.

10. A radio transceiver comprising:
a digital-to-phase synthesizer having a reference frequency input and a plurality of digital-to-phase synthesizer signal outputs,
the digital-to-phase synthesizer including an integrated phase-locked loop (PLL) voltage controlled oscillator (VCO) having the reference frequency input and an integrated PLL VCO signal output, the digital-to-phase synthesizer including a delay line having a delay line input coupled to the integrated PLL VCO signal output, the digital-to-phase synthesizer including a phase detector having an input coupled to an output of the delay line wherein an output of the phase detector is coupled to an input of the delay line, the digital-to-phase synthesizer including a first multiplexor having a plurality of inputs coupled to signal taps along the delay line, and the digital-to-phase synthesizer including a second multiplexor having a plurality of inputs coupled to signal taps along the delay line;
a first mixer having an input coupled to a first one of the plurality of digital-to-phase synthesizer signal outputs;
a second mixer having an input coupled to a second one of the plurality of digital-to-phase synthesizer signal outputs;
an antenna coupled to the first mixer and to the second mixer; and
a demodulator having a first input coupled to an output of the first mixer, the demodulator having a second input coupled to an output of the second mixer.

11. The radio transceiver of claim 10, the digital-to-phase synthesizer comprising a digital-to-phase processor and a tap selector for controlling inputs of the first and second multiplexors.

12. The radio transceiver of claim 10, the first and second of the plurality of digital-to-phase synthesizer signal outputs having the same frequency.

13. The radio transceiver of claim 10, the first and second of the plurality of digital-to-phase synthesizer signal outputs having the same phase.

14. The radio transceiver of claim 10, the first and second of the plurality of digital-to-phase synthesizer signal outputs having a different phase.

15. The radio transceiver of claim 10, the first and second digital-to-phase synthesizer signal outputs are in quadrature.

16. The radio transceiver of claim 10, the demodulator includes a global positioning system (GPS) baseband processing portion, the demodulator includes a cellular communications baseband processing portion.

17. The radio transceiver of claim 10, the demodulator includes a wireless wide area network (WAN) baseband processing portion, the demodulator includes a cellular communications baseband processing portion.

18. A method in a radio transceiver, comprising:
receiving a signal;
down-converting the signal received by mixing it with a digital-to-phase synthesizer output signal produced from a plurality of signals tapped along a delay line;
demodulating the down-converted signal.

19. The method of claim 18, down-converting the signal received by mixing it with first and second digital-to-phase synthesizer output signals having the same frequency and phase.

20. The method of claim 18,
receiving the signal at first and second separate antennas;
mixing the signal with first and second digital-to-phase synthesizer output signals having the same frequency,
realizing an adaptive array by changing the phases of at least one of the first and second digital-to-phase synthesizer output signals.

21. The method of claim 18, generating the output signal of the digital-to-phase synthesizer by selecting taps along the delay line of the digital-to-phase synthesizer.

22. The method of claim 18, receiving the signal by receiving first and second signals at a two terminal differential antenna, down-converting the first and second signals received by mixing the first and second signals with corresponding first and second digital-to-phase synthesizer output signals, demodulating the down-converted signals.

\* \* \* \* \*